Nov. 15, 1966   D. BOUVIER   3,285,274
VALVE UNIT FOR LIQUEFIED GAS CONTAINERS
Filed May 26, 1964   2 Sheets-Sheet 1
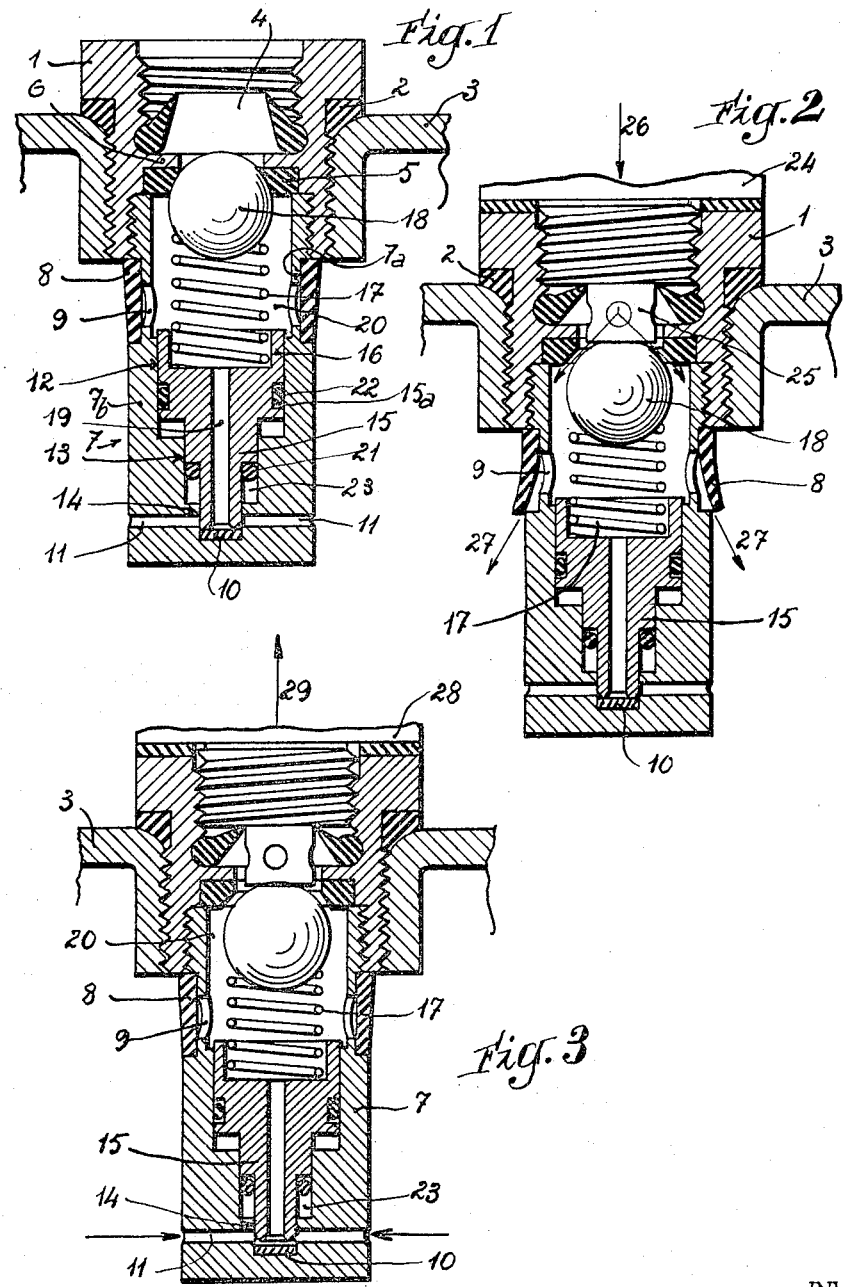

Nov. 15, 1966   D. BOUVIER   3,285,274
VALVE UNIT FOR LIQUEFIED GAS CONTAINERS
Filed May 26, 1964   2 Sheets-Sheet 2
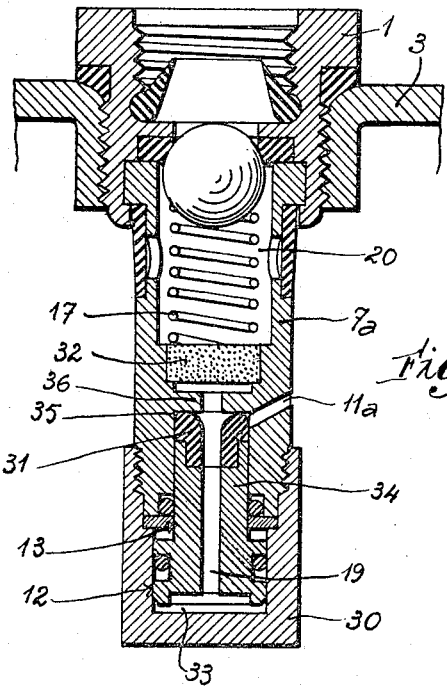
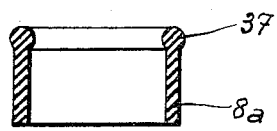
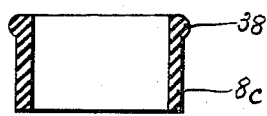
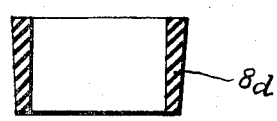
INVENTOR.
Daniel Bouvier
BY United States Patent Office 3,285,274
Patented Nov. 15, 1966

1

3,285,274
VALVE UNIT FOR LIQUEFIED GAS CONTAINERS
Daniel Bouvier, Lyon, France, assignor to Application des Gaz, Paris, France, a French joint-stock company
Filed May 26, 1964, Ser. No. 370,248
Claims priority, application France, June 10, 1963, 43,720
3 Claims. (Cl. 137—322)

The present invention relates generally to valve units for liquefied gas containers or gas cartridges, more particularly for stoves or heating devices.

Valve units are known wherein a gas-cock or connecting member may be screwed, thus simultaneously opening a ball or any similar movable valve-member. The gas pressure is then substantially the same within the gas-cartridge and the pipe connected thereto. As a result thereof, it is impossible to use the same gas-stove or heating device with different cartridges containing liquefied gases under various pressures. In practice, the question comes up for cartridges containing either butane or propane both in the liquefied form. The inner pressure of propane cartridges is higher than the inner pressure of butane cartridges; this results in an impossibility of indifferently using the same apparatus with either propane or butane cartridges.

The present invention has for its object to suppress this disadvantage and it aims to provide a new and improved valve unit permitting to supply one and the same apparatus with a combustible gas delivered by gas containers having different inner pressures.

Another object of the invention is to provide a valve unit adapted to control the gas flow by transposing the pressure curves in keeping with the diameters of a differential piston.

These objects are accomplished in a preferred embodiment of the invention, wherein an obturating ball is urged against a seat member under the simultaneous action of the gas pressure and of a helical spring; the latter rests on a perforated differential piston slidably mounted within a cylindrical socket having on its bottom a seal-member against which it may be gas-tightly applied by the said helical spring, whilst the internal gas pressure sollicitates the said differential piston in the opposite direction. The cylindrical socket is preferably provided with a peripheral resilient sleeve to obturate radial perforations permitting to fill up the gas container.

It will be understood that the gas in the cartridge first has to raise the differential piston against the helical spring before arriving to the obturating ball. The amplitude of this piston displacement is practically independent of the pressure absolute value, since the said pressure actuates both end-faces of the said differential piston. This gas throttling permits to stabilize to an acceptable amount the pressure of the gas escaping out of the cartridge, whatever might be the original pressure within the latter.

In the drawings:

FIG. 1 is a longitudinal sectional view of a valve unit incorporating the features of the present invention, shown in closed position.

FIG. 2 is a corresponding view during the cartridge filling.

FIG. 3 illustrates the same valve unit in operation.

FIG. 4 shows an alternative embodiment of a valve unit according to the invention.

2

FIGS. 5, 6, 7 and 8 illustrate four possible embodiments of sealing sleeves for a valve unit according to the invention.

The valve unit shown in FIGS. 1, 2, 3 has a screw-threaded head 1 adapted to be screwed on a container or gas-cartridge 3 after interposition of a seal member 2. Said gas-cartridge 3 contains a liquefied combustible gas, for example butane or propane.

The screw-threaded head 1 is provided with an inner lip-seal 4 of known type and a flat annular seal 5 located against a shoulder 6. A metallic socket 7 is screwed within the screw-threaded head 1 and its upper face retains annular seal 5 against shoulder 6.

The socket 7 engages within the gas-cartridge 3 and it is provided with a peripheral groove 7a of relatively important axial length to receive a resilient annular sleeve 8 having a corresponding profile. The bottom of this groove 7a is provided with radial perforations 9 extending through the wall of socket 7. Sleeve 8 is preferably made of a resilient material such as rubber, plastic or the like. It is mounted on the socket 7 by resilient distortion and it snaps back into the said groove 7a, thus gas-tightly obturating the radial perforations 9.

The bottom of socket 7 is provided with an inner central recess to receive a flat seal 10 made of any adequate resilient material of known type. A diametral bore 11 extends transversely through socket 7 immediately above the upper face of seal 10.

The portion 7b of socket 7 located between the diametral bore 11 and the perforations 9 is realized with three different inner diameters, decreasing towards the bottom and delimiting three superposed cylindrical walls 12, 13 and 14.

A movable piston 15 has three different external diameters corresponding to the said three internal diameters of socket 7 and it is slidably mounted within the latter. The radial clearance provided between cylindrical walls 12, 13, 14 and the corresponding sliding portions of piston 15 is sufficient to allow a gas circulation from gas-cartridge 3 particularly along wall 14. Movable piston 15 has at its upper portion a peripheral edge 16 within which is located the lower end of a helical return spring 17. The upper end of the latter urges an obturating ball 18 against the said annular seal 5.

An axial perforation 19 extends throughout the piston 15 on the lower end of which it ends in front of the central portion of the flat seal 10. The upper face of the latter is thus connected to the inner space 20 where helical spring 17 is located. At last, a resilient annular seal 21 is gas-tightly mounted between the sliding piston 15 and the stationary wall 13, and a second resilient annular seal 22 is located within a peripheral groove 15a on the piston 15 in order to realize a gas-tight connection between the latter and the stationary wall 12. It will be apparent that piston 15 may be both freely and gas-tightly slid within the socket 7, the radial clearances however being sufficient to permit a pressure uniformity between gas-cartridge 3, diametral bore 11 and the annular space 23 where resilient annular seal 21 is located.

The operation is as follows:

Under normal conditions, helical spring 17 simultaneously urges the obturating ball 18 against the flat seal 5 on the one hand, and the small diameter end of piston 15 against the flat seal 10 on the other hand (FIG. 1). This flat seal 10 and the small diameter end of piston 15 materializes a seal-closing, as referred to in the following claims.

If desiring to fill up the gas-cartridge 3 it is sufficient to screw on the head 1 a connecting member 24 of known type having a nose 25 which presses back obturating ball 18 from its seat. The filling gas flows in the direction of arrow 26 and, under its pressure effect, resilient sleeve 8 is outwardly distorted thus uncovering the perforations 9. The filling gas then freely flows into the gas-cartridge 3 as indicated by arrow 27. During this operation, piston 15 remains in gas-tight contact with flat seal 10 under the simultaneous action of helical return spring 17 and of the delivered gas pressure.

On the contrary, if desiring to supply a burner or like apparatus with combustible gas from gas-container 3, it is sufficient to screw, on the head 1, a connecting member 28 (FIG. 3) similar to the above-mentioned connecting member 24. However, contrarily to the preceding case, the gas pressure within connecting member 28 is lower than within the gas-cartridge 3. This lower pressure then exists in the inner space 20 and the gas has a tendency to flow in the direction of arrow 29. Sliding piston 15 is simultaneously actuated by the high pressure within diametral bore 11 and by the antagonistic lower pressure in inner space 20. The corresponding cross-sections of piston 15 are adequately determined so that the said piston 15 have a tendency to be elevated above the flat seal 10 against helical return spring 17. This elevation results in a pressure increase within inner space 20; if this movement exceeds a predetermined amplitude limit, the simultaneous action of gas pressure and helical return spring 17 on piston 15, which materializes a differential piston, sollicitates the latter in direction of the said flat seal 10. It will be understood that a stable equilibrium is obtained and sliding piston 15 is at a position where the gas pressure within inner space 20 is stabilized at a predetermined fixed value. More particularly, it is apparent that, if the internal gas pressure of gas-cartridge 3 were substantially higher, the gas pressure within inner space 20 would not proportionally increase since piston 15 works as a differential piston. As a result thereof, it is possible to use a valve unit according to the invention indifferently with gas-cartridge 3 containing either propane or butane, for one and the same heating apparatus.

In operation, perforations 9 are gas-tightly obturated by resilient sleeve 8 as a result of the simultaneous action of gas pressure and of the said resilient sleeve 8.

In the embodiment of the invention as shown in FIG. 4, a new piston 34, located beyond a transverse bore 11a similar to diametral bore 11, has been substituted for the said piston 15. For this purpose, the socket has been replaced by another socket 7a on the lower portion of which is screwed a cap 30. As previously, piston 34 is slidably mounted within two cylindrical walls 12, 13 having decreasing diameters. Its small-diameter-end is rigidly secured to an annular seal 31 having an axial opening connected to an axial bore 19 and possibly coming into contact with a stationary shoulder 36 on socket 7a. A porous cylindrical flat member 32 of sintered metal is located above shoulder 36 against which it is urged by helical return spring 17. Inner space 20 is connected with the inner space 33 located under the big-diameter-end of piston 34 through porous member 32 and bore 19. Annular seal 31 does not completely fill the inner space under shoulder 36. It delimits an annular inner space 35 having a function similar to the above-mentioned inner space 23. Transverse bore 11a ends in inner space 35.

Annular seal 31 and shoulder 36 materialize a seal-closing, as referred to in the following claims.

The operation corresponds to the preceding description.

More particularly, if no other sollicitation takes place, helical return spring 17 urges, obturating ball 18 against annular seal 5 on the one hand, and porous cylindrical member 32 against shoulder 36 on the other hand. The gas pressure within inner spaces 20, 33 and 35 is uniform and equal to the gas pressure within gas cartridge 3; the annular seal 31 on piston 34 is pressed against shoulder 36 by differential piston effect.

If desiring to fill up the gas-cartridge 3, the operation is as previously described and perforations 9 are uncovered by elastic distortion of resilient sleeve 8. In the meantime, elements 32, 31 and 34 keep their original position.

On the contrary, if desiring to use the gas-cartridge 3, it is sufficient to mount on the head 1 a connecting member 28, not shown in FIG. 4. The gas pressure within inner spaces 20 and 33 decreases under the valve observed within transverse bore 11a and annular inner space 35; piston 34 and annular seal 31 thus have a tendency to be displaced downwardly, i.e. to move back from the seat-shoulder 36. The gas retained within transverse bore 11a thus penetrates into the axial opening of annular seal 31, then it flows through porous cylindrical member 32 and fills up inner space 20 before escaping outside. This results in a pressure increase within inner spaces 20 and 33; piston 34 is then urged back against shoulder 36, by differential piston effect. This time, the raising movement of piston 34 with respect to the shoulder 36 is independent of helical return spring 17, but it is apparent that the resulting gas flow from gas-cartridge 3 is controlled by piston 24 and depends upon its equilibrium position when open. Porous cylindrical member 22 produces an additional loss-of-head and it may constitute one of the gas-flow control means. Moreover, during the filling up operation it prevents any inopportune particles to be introduced on the different seals and to damage them. As well as with the above-mentioned first embodiment of the invention, such a valve unit may be indifferently mounted on gas-cartridges 3 containing butane, propane or another liquefied gas, under any pressure. As a matter of fact elements 34, 30, 31, 32 constitute a kind of relief-valve since the gas pressures within, and out of, gas-cartridge 3 do not increase proportionately.

FIGS. 5, 6, 7 and 8 illustrate four alternative embodiments of resilient sleeve 8.

The latter may consist of a cylindrical sleeve 8a made in rubber or in plastics and having a peripheral rim 37 of circular cross-section. According to the embodiment shown in FIG. 6, a resilient sleeve 8b has only a simple cylindrical geometric profile.

The sleeve 8c shown in FIG. 7 is cylindrical and its upper portion is provided with a semi-circular external rim 38.

At last, the resilient sleeve 8d shown in FIG. 8 has an inner cylindrical wall and a slightly conical outer wall. When mounting resilient sleeve 8d on a valve unit according to the invention, its conicity has to be preferably downwardly orientated.

Minor changes may be made without departing from the spirit and scope of the invention as claimed. More particularly, a porous member such as 32 may be located within edge 16 (FIG. 1) on piston 15 to receive the corresponding end of helical return spring 17.

I claim:

1. In a valve unit for liquefied gas-cartridges having an obturating ball urged against a seat by the simultaneous action of gas pressure in the cartridge and a helical return spring, the combination of an axially perforated differential piston slidably mounted within a socket adapted to gas-tightly cooperate with a small-diameter-end of said differential piston by means of a seal closure means, the big-diameter-end of said differential piston being permanently connected to the inner space adjacent said obturating ball, and receiving gas from the inner space of said gas-cartridge only after displacement of the said obdurating ball from its seat and the gas from the inner space of the cartridge displacing said piston away from said closure for discharging the gas from said cartridge.

2. A valve unit as claimed in claim 1, wherein the said return spring rests on the said perforated differential piston, whilst the said seal closing comprises a flat seal rigidly secured to the said socket.

3. A valve unit as claimed in claim 1, wherein the said return spring rests on a stationary cylindrical porous member under which is located the said differential piston, the latter carrying, rigidly secured thereto, the seal of the said seal-closing, and being operated only by differential piston effect.

References Cited by the Examiner

UNITED STATES PATENTS

| 2,191,611 | 2/1940 | Eshbaugh et al. | 137—493 X |
| 2,713,874 | 7/1955 | Sundstrom | 137—322 |
| 3,186,449 | 6/1965 | Dupont | 141—353 X |

FOREIGN PATENTS 1,254,883 4/1960 France.

WILLIAM F. O'DEA, *Primary Examiner.*

D. R. MATTHEWS, *Examiner.*